March 18, 1947.  P. H. MITCHELL ET AL  2,417,606
FURNACE FOR THE PRODUCTION OF CARBON BLACK
Filed June 3, 1943  2 Sheets-Sheet 1

Inventor.
P. H. Mitchell
Scott Malcolm
by A. J. Dennison
atty.

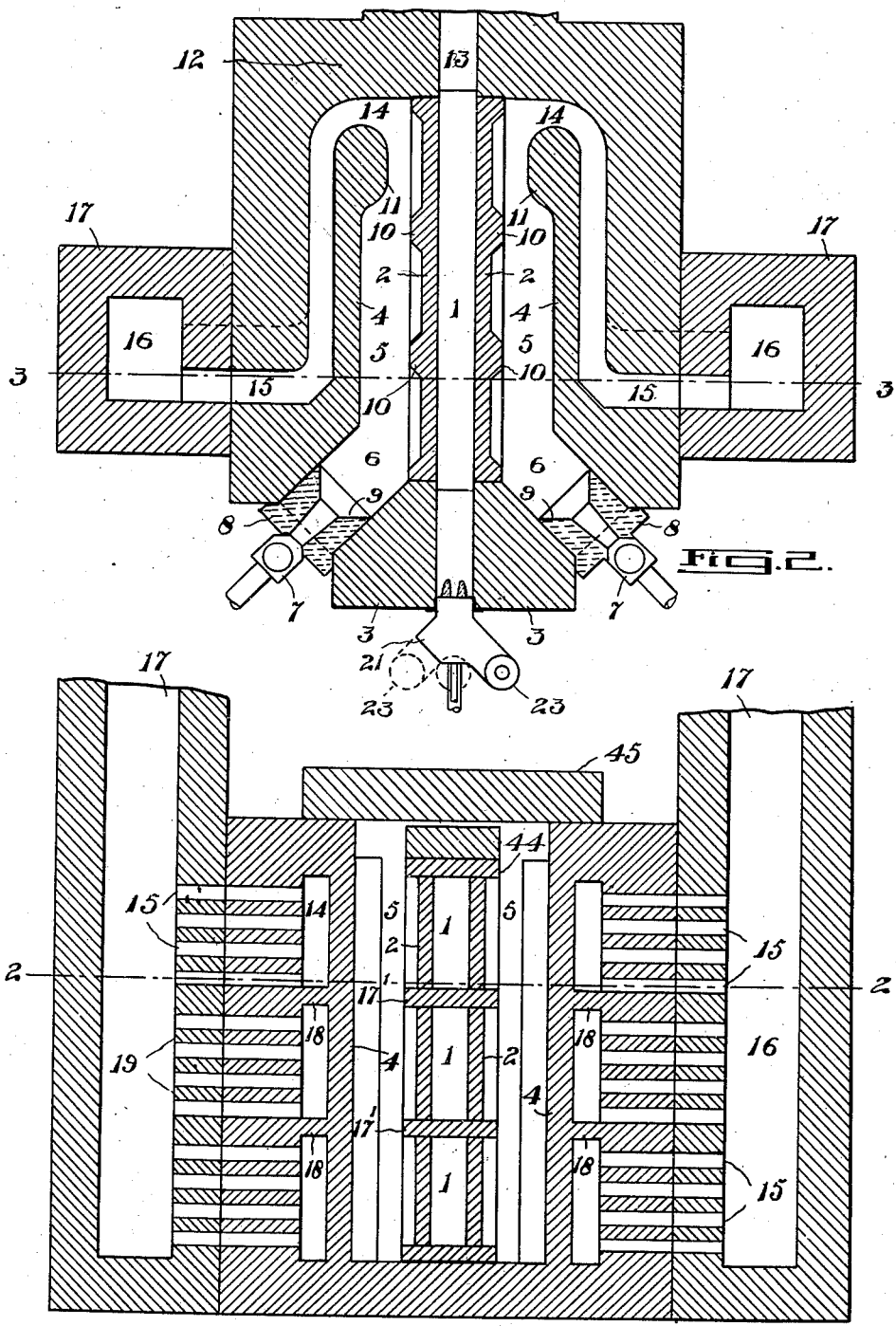

Patented Mar. 18, 1947

2,417,606

UNITED STATES PATENT OFFICE 2,417,606

FURNACE FOR THE PRODUCTION OF CARBON BLACK

Percival H. Mitchell and Scott Malcolm, Toronto, Ontario, Canada

Application June 3, 1943, Serial No. 489,580

8 Claims. (Cl. 23—259.5)

This invention relates to the production of carbon black and principally to the type of carbon black designated as "semi-reinforcing," and the principal object of the invention is to effect a material economy in the total quantity of gases or other hydrocarbon used in the production of the carbon black, thereby effecting a material increase in the net yield of the product.

A further important object is to provide a furnace which will enable the production of grades of carbon varying in physical characteristics through the structure permitting an extensive range in the manipulation of velocities and relative velocities and temperatures within the reaction chamber.

A still further object is to provide a furnace which will enable a material reduction in the size and capacity and therefore the cost of ducts, coolers, precipitators, cyclone separators, tail fans and stacks in the carbon line.

A further and important object is to devise a structure of furnace in which centralized dissociation chambers are flanked by direct combustion chambers whereby effective control of the heat applied for dissociation can be controlled.

The principal feature of the invention consists in the novel construction of furnace whereby combustion chambers are arranged either side of a centralized dissociation chamber or chambers physically separated therefrom, and the heat of combustion is largely conserved and directed inwardly by return flues arranged outside of the main combustion chambers.

In the accompanying drawings

Figure 2 is a horizontal sectional view taken through the improved type of furnace on the line 2—2 of Figure 3.

Figure 3 is a transverse vertical section of the furnace taken through the line 3—3 of Figure 2.

Figure 1:
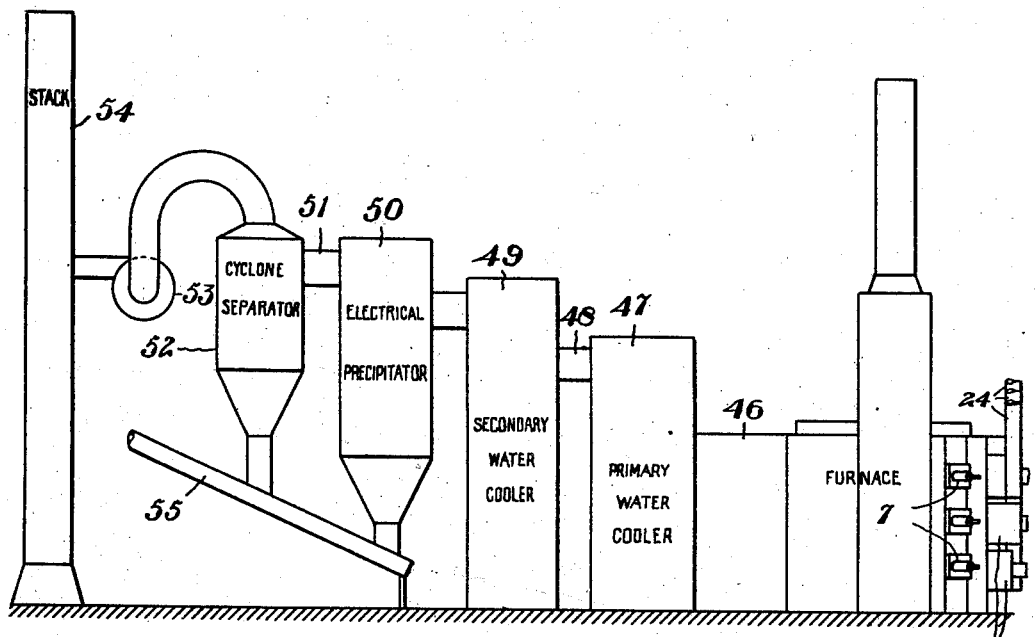
Figure 1 is an elevational diagrammatic view of a carbon-producing plant, including a furnace and its auxiliary equipment.
Figures 4, 5:
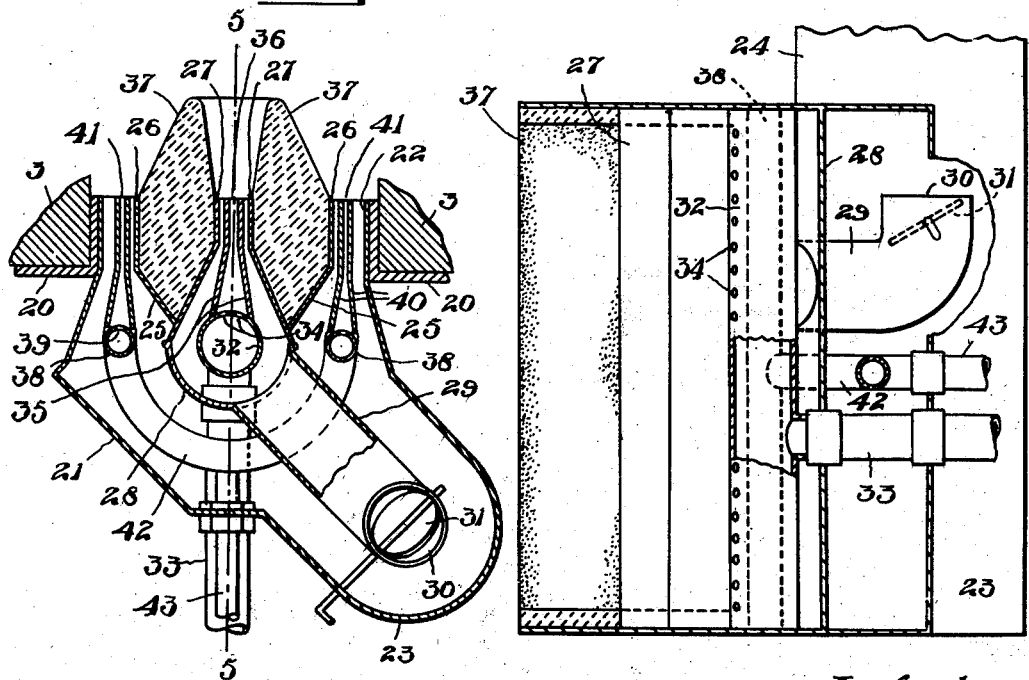
Figure 4 is an enlarged horizontal sectional view through one of the gas dissociation burner members.
Figure 5 is a vertical sectional view through the burner illustrated in Figure 4 taken on the line 5—5 thereof, parts thereof being broken away.

In the present methods of production of carbon black it is the usual practice to provide heat within a common reaction chamber for the dissociation of a portion of a hydrocarbon gas, such as methane in combination with ethane and propane. The combustion is manipulated to produce incomplete combustion with restricted air supply, producing carbon monoxide in maximum proportions and carbon dioxide in minimum proportions.

When combustion is proceeding along with dissociation of gas to carbon and hydrogen within the same reaction chamber for the specific and ultimate yield of free carbon, the steam and carbon dioxide from combustion react with the incandescent carbon from dissociation forming carbon monoxide. Thus more or less carbon is lost as an end product of the process.

In accordance with the present invention it is proposed to project parallel streams of a combustible mixture along the inner walls of a dissociation chamber and to project a major stream of dissociation gases in between these parallel streams, but the major application of heat to the dissociation chamber is applied through the walls thereof from combustion chambers arranged on either side so that the products of combustion of this major heat application are completely separated from the gases of dissociation.

In the form of furnace herein shown a narrow elongated dissociation chamber 1 is formed between a pair of parallelly spaced refractory walls 2 which extend inwardly from the central portion 3 of the main furnace structure.

Spaced from the outer vertical sides of the walls 2 and extending substantially parallel therewith are the furnace walls 4 which form combustion chambers 5 arranged either side of the central structure, said combustion chambers 5 preferably having outwardly flaring portions 6 in which are mounted the burner nozzles 7.

The burner nozzles 7 are set in refractory blocks 8, closing the ends of the chambers 6, and said nozzles direct a mixture of combustible gases angularly inwardly through flaring vertical orifices 9 in the blocks 8 to impinge against the walls 2, enclosing the dissociation chamber 1.

The walls 2 are preferably provided with outwardly extending vertical ribs 10 which deflect the flame projected inwardly from the nozzles 7, directing it outwardly to impinge against the walls 4 from which it rebounds, striking the walls 2 intermediately between the ribs 10, and the walls 4 are provided with inwardly converging portions 11 which constrict the flue passages 5 at the end farthest from the nozzle.

The end wall 12 of the furnace abuts the walls 2 and has a central opening 13 corresponding with the width of the dissociation chamber 1.

Flue passages 14 are arranged between the inward ends of the walls 4 and the furnace end wall 12, and these passages extend parallelly with the walls of the chambers 5 and conduct the products of combustion in contact with the outer surfaces of the walls 4, back to a point closely approaching the front end of the furnace where said flues are turned laterally and discharge through divided horizontal passages 15 into the vertical flues 16 of the stacks 17.

The dissociation chamber 1 is preferably divided in its vertical height by an arrangement of a plurality of refractory slabs 17'. These horizontal divisions unify the flow of gases through the elongated dissociation chamber 1.

Similarly the flue passages 14 outside of the walls 4 may be divided vertically by partition walls 18. The communicating passages 15 from the flues 14 to the stack flues 16 are also preferably divided by horizontal division walls 19.

The front end of the combustion chamber 1 extending through the wall 3 is provided with a plurality of metal frames 20, preferably formed of angle iron, which are suitably secured in the walls, and within each of these frames and between the top and bottom limits thereof are arranged the burner structures 21, three of such burners being indicated in spaced-apart vertical arrangement in Figure 1 of the drawing, such burners corresponding with the three divisions of the dissociation chamber 1 illustrated in Figure 3.

The outer casing of each of the burners is formed with a rectangular mouth 22 fitting snugly within the frames 20, and at the outward side each burner casing is provided with an angularly offset part-cylindrical portion 23, the offset cylindrical part of one of these burners being to the right, the other to the left, and the other is centrally arranged, as indicated in Figures 1 and 2, and to each of these portions is connected an upwardly extending tube 24 to which air under pressure is supplied from any suitable source, such as a centrifugal fan.

Centrally arranged in the width of the mouth portion 22 of the burner casing and extending from top to bottom thereof is arranged a metal structure formed with a spaced-apart pair of horizontally V-shaped walls 25, the outward sides 26 of which are parallel with and spaced from the parallel side walls of the mouth of the casing 1, thus forming a pair of long, narrow, vertical channels through which a flow of air is directed from the casing into the interior of the dissociation chamber 1 close to the side walls thereof.

The inward walls 27 of the V-shaped members 25 are spaced apart and parallel, and secured to or connected with the inward edges of the V-shaped structures is a part-cylindrical wall 28 which extends from top to bottom of the casing 21, and to this wall 28 is connected a conduit 29, which extends outwardly into the part-cylindrical portion 23 of the burner casing, and is provided with an open mouth 30 extending upwardly and controlled by a damper 31.

A flow of air is directed through the conduit 29 into the interior of the casing 28 to flow outwardly through the parallel side walls 27 centrally into the chamber 1.

Within the casing 21, and preferably spaced centrally of the semi-circular wall 28, is a vertical tube 32 which is connected to a pipe 33 leading from a suitable source of hydrocarbon gas supply. The tube 32 is provided with rows of perforations 34 throughout its length to direct the flow of gas toward the opening between the walls 27.

A pair of vertically disposed walls 35, connected to the perimeter of the tube 32 either side of the perforations therein, converge inwardly and terminate in parallel spaced-apart portions forming a narrow, vertical orifice 36 which projects a narrow sheet of gas centrally into the dissociation chamber 1. This narrow sheet of gas is flanged on either side by the narrow sheets of air projected between the walls 35 and the walls 27 of the vertical air conduit. The thin sheets of air protect the inlet conduit walls from accumulations of carbon and this is restricted to a minimum by the damper 31.

Housed within the V-shaped members 25 are a pair of refractory bars 37 which extend vertically from top to bottom of the casing 21 and these bars extend beyond the inner edge of the casing 21 from the parallel side walls 26 and 27, and they are formed to flare slightly outward from the walls 27 and to converge inwardly from the walls 26, thus presenting a refractory protecting element for the walls of the casing and its component parts described.

Housed within the casing 21 and spaced laterally beyond the walls 27 thereof are a pair of vertical tubes 38 which are provided with perforations 39 throughout their length opening toward the interior of the furnace.

Extending from each of the tubes 38 are converging walls 40 which terminate in parallel arrangement, forming narrow mouth openings 41. These mouth openings are preferably arranged closely adjacent to the inner walls 26, and combustible hydrocarbon gas is projected through these narrow mouth openings with a thin sheet of air flowing along the inner side and a heavier sheet of air flowing along the outer side.

The gas is fed to the vertical tubes 38 through a semi-circular conduit 42 connected to a pipe 43 which leads from a suitable source of hydrocarbon gas supply.

In the operation of the furnace herein described suitable means, not shown, is provided for igniting the gas projected into the central dissociation chamber 1 and into the laterally disposed combustion chambers 2. The heat derived from gas burned only within the dissociation chamber is deficient for the exothermic requirements in the production of the carbon black and analysis of the temperatures in this chamber due to combustion in that chamber alone indicates that after a limited portion of the gas is dissociated the temperature is reduced and further dissociation is restricted.

The gas temperature gradient throughout the length of the reaction chamber due only to gas burned within it is from cool admission through a 1200° F. zone where dissociation commences to a temperature of from 2100° F. to 2350° F. at a point about half way of the length of the furnace where a temperature drop occurs due to work being done.

The arrangement of the combustion chambers on either side of the dissociation chamber causes the flames of combustion therein to be directed to first impinge angularly on the conducting walls in an area corresponding to the 1200° F. zone of the dissociation chamber. The heat waves first being deflected outwardly and then inwardly causes the concentration of heat on the walls of the dissociation chamber at a zone approximately where the temperature drop occurs due to work done within the dissociation chamber.

The major addition of exterior heat is thus applied in zones where such heat is best applicable and where temperature differentials are greatest.

The arrangement of the horizontal division walls or slabs 17' in the height of the dissociation chamber prevent undue turbulence and these slabs also form effective heat conductors absorbing and conducting heat inwardly from the outer combustion chambers.

It will be noted that the outer walls 4 of the combustion chambers, and particularly at the contracted zones 11, are highly heated and provide radiant heat directed toward the conducting wall. The heat in these outer walls of the combustion chambers is unified and maintained by the arrangement of return flues 14 outside of the walls 4 through which the products of combustion travel to the ultimate escape flues in the stacks.

The walls of the dissociation chamber are preferably formed of blocks of silicon carbide as also are the dividing slabs and the top cover slab 44, the latter being preferably weighted by a heavy covering of firebrick.

The top of the furnace, including the combustion flues, is closed by a slab 45 and this is preferably spaced slightly above the slab covering the top of the dissociation chamber, thus allowing independent expansion of the dissociation chamber structure and a restricted equalization of draft between the two combustion chambers.

It will be noted that the discharge ports formed by the horizontal passages 15 leading from the flue passages 14 will ensure an even flow of gases through the passages 11.

It will be understood that in a furnace of this type there will be a tendency for the heat generated to dissociate gas within or close to the nozzle and thereby cause a deposit of carbon. This difficulty is overcome by the arrangement of the narrow air passages between the central gas nozzle 36 and the flanges 27 and between the gas nozzles 41 and the inner boundary plate 26 of the burner casing.

It will be understood of course that suitable thermo-couples and $CO_2$ recorders may be arranged within a furnace such as described so that relative temperatures may be properly indicated in order to adjust the control of air and gas through the several chambers.

It will be understood from this description that a centralized flow of gas flanked on either side by a flow of air is projected into the centre of the dissociation chamber and a separate flow of gas is arranged adjacent to the side walls of the dissociation chamber with an outside flanking sheet of air of greater volume than that of the gas.

This disposition of air and gas results in burning much of the gas to a high $CO_2$ content adjacent to the walls.

The larger flow of gas through the central orifice 36 with only a minimum amount of air available at the sides thereof will effect very little combustion but the major portion is dissociated. The resultant gases are subject to moderate turbulence in the central part of the reaction chamber.

The provision of flow of air and gas parallel to and adjacent the boundary walls of the reaction chamber provides an efficient screen adjacent to the highly heated boundary walls which prevents contact with the furnace wall surfaces and consequent deterioration of the carbon formed in the process of dissociation.

Further, any carbon deposited on the walls within the outer streams of combustion gases is quickly burned off by the oxidizing combustion products. Therefore the walls are maintained in a state of highest efficiency for conduction and radiation of heat.

The dissociation or reaction chamber is continued into the passage 13 leading through the furnace wall and on through a conduit 46 to a primary water cooler 47, thence by conduit 48 to a secondary water cooler 49, thence to an electrical precipitator 50, then by conduit 51 to a separator 52. The draft is effected by a suction fan 53 leading to a stack 54.

The carbon intercepted in the precipitator 50 and the cyclone separator 52 is removed to suitable storage by a conveyor 55.

It will be readily appreciated that with a furnace such as described there may be many variations in its operation.

The relative dimensions of the nozzles for projecting flat sheet-like streams of air and gas may be altered to suit various requirements. So also the air pressure and gas pressure may be varied as well as the type of hydrocarbon gas used in either the reaction chamber or combustion chambers.

Within the reaction chamber heat for dissociation is from the combustion of interior gases and from the radiant boundary walls which are heated from the interior gases and from the combustion chambers parallelling the same.

A furnace built on a practical scale in accordance with the design herein shown and described can be made with conducting walls and temperature differentials capable of transmitting approximately one million B. t. u.'s per hour from the combustion chambers to augment the heat generated within the reaction chamber, consequently any deficiency within practical limits in the heat required for dissociation can be supplied from the outer combustion chambers.

The interior combustion gases maintain a well defined parallel path adjacent the boundary walls, with the more central zones of the combustion gases moving with a moderate turbulence.

What we claim as our invention is:

1. A furnace for the production of carbon black from hydrocarbon gas having a narrow elongated dissociation chamber, nozzles arranged centrally of the width adapted to direct a flow of gas into one end of said chamber, nozzles arranged on both sides of said central nozzles adapted to direct a controlled flow of air on both sides of said centralized flow of gas, combustion chambers arranged on both sides of said dissociation chamber, discharge flues leading from said combustion chambers, and nozzles adapted to direct a combustible mixture into said combustion chambers.

2. A furnace as claimed in claim 1 having nozzles arranged parallel with the air nozzles which are arranged on both sides of the central gas nozzle and adapted to direct streams of gas along the inner walls of the dissociation chamber.

3. A furnace for the production of carbon black as claimed in claim 1, in which the nozzle for feeding the centralized stream of gas into the dissociation chamber is formed with a vertically arranged long, narrow mouth opening into said chamber centrally of its width, and extending from top to bottom thereof an air nozzle having vertical parallel walls and spaced from the walls of the aforesaid central nozzle constructed and arranged to direct thin parallel streams of air on both sides of the centralized stream of gas, said air nozzle extending from top to bottom of the dissociation chamber, and converging refractory members projecting inwardly into said dissociation chamber on both sides of said central gas and air nozzles and extending from top to bottom of said chamber.

4. In a furnace for the production of carbon black as claimed in claim 1, a casing having a rectangular open end fitted into one end of said dissociation chamber, a pair of vertically arranged refractory members spaced apart and arranged centrally in the width of the open end of said casing and extending from top to bottom thereof, a perforated gas-feeding tube arranged centrally of the width of said casing and extending from top to bottom thereof, a pair of vertically arranged walls connected with said tube on both sides of the perforations therein and extending between and spaced from said spaced refractory members and forming the central elongated gas-discharging nozzle, a pair of gas-feeding perforated tubes vertically arranged within said casing and extending from top to bottom thereof, a pair of convergent walls connected with each of said latter gas tubes and extending inbetween the outer walls of the casing and said refractory members and spaced therefrom forming a pair of vertical nozzles adapted to project a sheet of gas into said chamber on both sides of the refractory members, an air conduit connected with said outer casing and the vertical narrow passages arranged on both sides of the nozzles leading from the paired arrangement of vertical gas tubes, a conduit surrounding the central vertically arranged gas tube, means for directing air from the aforesaid air conduit into the centralized conduit surrounding said central gas tube, and damper means for controlling the air pressure in said central conduit.

5. A furnace for the production of carbon black from hydrocarbon gas, comprising a pair of parallel vertical heat conducting refractory walls spaced apart and forming a dissociation chamber, a pair of vertical walls arranged parallel with and spaced outwardly from the aforesaid walls and forming a pair of combustion chambers arranged on both sides of the dissociation chamber, furnace walls arranged parallel with and spaced from the aforesaid outer walls which enclose said combustion chambers and which form flues connected with one end of each of said combustion chambers, discharge flues connected with the aforesaid flues, burner nozzles in one end of each of said combustion chambers, nozzles adapted to direct a stream of gas centrally through said narrow dissociation chamber, and nozzles on both sides of said central nozzle.

6. A furnace as claimed in claim 5, in which the burner nozzles in the combustion chambers are angularly disposed and arranged to direct flames to impinge against the outer side of the walls of said dissociation chamber.

7. A furnace as claimed in claim 5, in which the refractory walls of the dissociation chamber are formed with vertical ribs spaced apart and extending outwardly therefrom and the burner nozzles are angularly arranged to direct flames inwardly to impinge against said dissociation chamber walls between pairs of said ribs, and the outer walls of said combustion chambers are provided with inward projections at their ends remote from said burner nozzles adapted to intercept the flow of the products of combustion and direct same inwardly against the walls of said dissociation chamber between other of said vertical ribs.

8. A furnace for the production of carbon black from hydrocarbon gas, comprising a pair of parallelly arranged and spaced-apart vertical heat-conducting refractory walls, heat-conducting refractory slabs arranged horizontally in vertically spaced relation between said parallel walls and dividing said dissociation chamber into a plurality of superposed chambers, nozzles centrally mounted at one end of each of said spaced-apart chambers adapted to direct a stream of gas into said dissociation chambers, nozzles on both sides of said centrally arranged nozzles, vertical walls spaced from the vertical walls of said dissociation chamber and extending throughout the total height thereof, furnace walls spaced from the walls forming the outer walls of said combustion chambers and forming discharge flues from said combustion chambers, and burner nozzles in said combustion chambers at the ends remote from said exhaust flues.

PERCIVAL H. MITCHELL.
SCOTT MALCOLM.

REFERENCES CITED

The following references are of record in the file of this patent:

UNITED STATES PATENTS

| Number | Name | Date |
|---|---|---|
| 2,144,971 | Heller | Jan. 24, 1939 |
| 1,892,862 | Wilcox | Jan. 3, 1933 |
| 2,121,463 | Wisdom | June 21, 1938 |
| 1,773,002 | Hunt | Aug. 12, 1930 |
| 1,490,469 | Laird | Apr. 15, 1934 |

FOREIGN PATENTS

| Number | Country | Date |
|---|---|---|
| 26,578 | British | 1905 |